March 22, 1932. W. F. ALDER 1,850,615
MOTION PICTURE APPARATUS
Filed Nov. 6, 1929 3 Sheets-Sheet 1
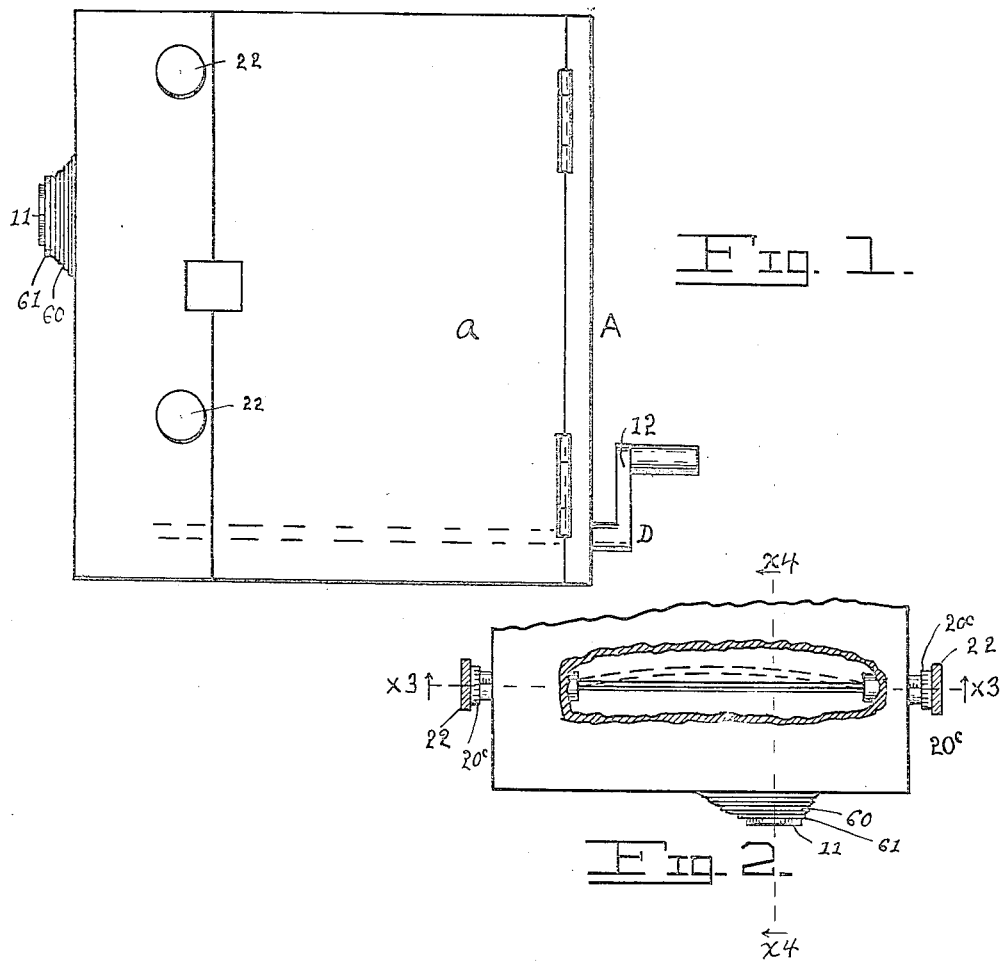

March 22, 1932.  W. F. ALDER  1,850,615
MOTION PICTURE APPARATUS
Filed Nov. 6, 1929  3 Sheets-Sheet 2

INVENTOR,
William Fisher Alder
Hazard & Miller
HIS ATTORNEY.

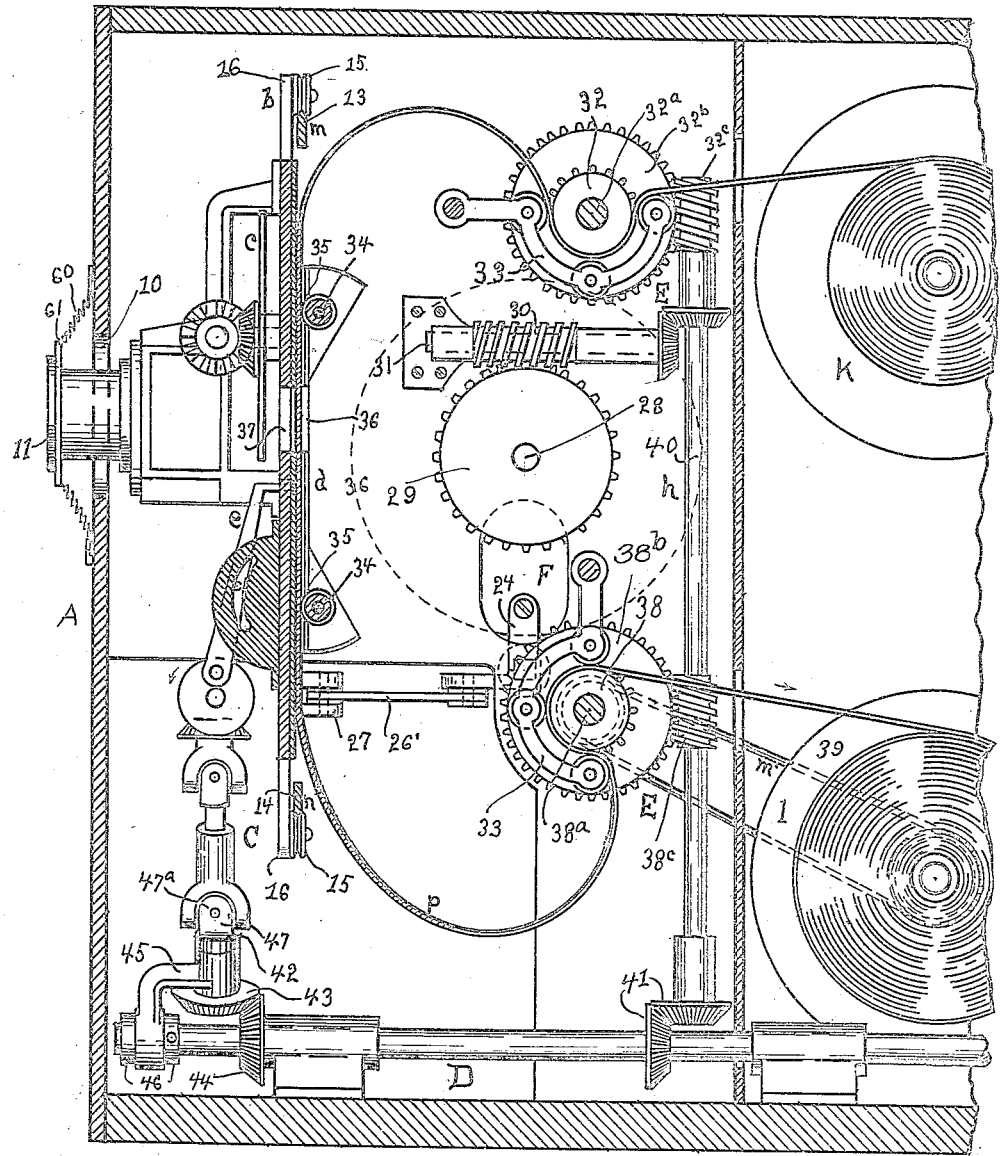
Fig. 4.
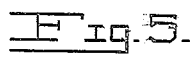
Fig. 5.
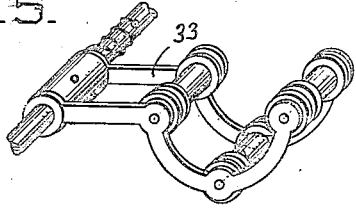
INVENTOR,
William Fisher Alder
HIS ATTORNEY Patented Mar. 22, 1932

1,850,615

UNITED STATES PATENT OFFICE

WILLIAM F. ALDER, OF LOS ANGELES, CALIFORNIA, ASSIGNOR, BY MESNE ASSIGNMENTS, TO RALPH P. MERRITT, OF FRESNO, CALIFORNIA

MOTION PICTURE APPARATUS

Application filed November 6, 1929. Serial No. 405,335.

This invention relates to motion picture apparatus, and more particularly to apparatus for recording images by photographic process, upon a moving or advancing film, which images, when photographically developed are projected by suitable apparatus upon a screen or exhibiting surface. The invention pertains more particularly to the arrangement and mounting of the shutter or film exposing features and the lens through which the light rays are admitted to the shutter and by the shutter to the film. Ordinarily such features are fixedly mounted in the case or upon the frame of the picture taking apparatus. In accordance with the present invention these features are movably arranged, and means are provided for actuating the same in a predetermined manner or upon or along a predetermined path or paths, simultaneously with the actuation of the shutter and the film feeding or advancing means. It results that as the film is advanced and the shutter operated, for the production of successive light impressions upon the sensitive film, the film itself is moved independently of its feeding movement and in such a path or in such a direction as to shift the zone of exposure of the film progressively, whereby a continuously varying angularity is produced as between the subject being recorded upon the film and the film surfaces receiving such recordation. The particular advantage of so mounting and arranging the film exposing means consists in the production of recorded images of a nature more true to the conformation or mass of the subject being recorded and likewise more true to the perspective relations between various parts of such subject, as for instance between a number of objects at varying distances from the apparatus.

A similar effect is produced by means of the well known stereoscope as applied to the viewing of flat surface pictures, and whereby the details of the same are presented to the eye upon the perspective principle, thus the photographing apparatus is caused to sweep the field of the subject being photographed in such manner as to constantly shift the angle of presentation of the sensitive surface to the subject, and the subject, and all parts thereof, as recorded upon the light sensitive surface or film, will be caused to bear a more true relation to the actual spacing and relation of the component parts of the subject, as the human eyes themselves in their joint capacity would view the same. When the images recorded upon the film are projected successively in the displaying of the picture, one image merges into the other in such sequence, in the presentation of the same to the eye, with this factor of shifting angularity of the line of vision, so that effects are produced similar to those which would be produced directly upon the vision were the subject portrayed directly viewed by the eyes. The invention thus operates to produce these effects when the subject photographed comprises component parts varying in remoteness from the film, and the picture produced in the production of the developed images has the same depth, in kind, that attaches to direct viewing of such subject by the human eyes. Further in accordance with the invention means are provided for varying or altering the path traversed by the film exposing means, or for varying or altering the movement or motion which the film exposing means is caused to execute. The film exposing means may thus be moved in a rectilinear path, or in any predetermined path greater in length than such rectilinear path and between two given points thereon or at the ends thereof.

By mounting the sensitized film and the exposing mechanism movably, and shifting the same back and forth along a predetermined path, or giving the same a predetermined movement, the effects recited are produced as effectively and positively as though the entire picture-taking apparatus were moved. The case and frame of such apparatus are permitted to remain stationary, and only the lighter film-exposing features contained therein are moved, and this is performed by the application of but little power, simultaneously, as stated, with the feed of the film and the operation of the shutter.

The invention has for further objects the provision of improvements of the general character stated which will be relatively simple and inexpensive in construction and organization, when taken into consideration with facility of adjustment, positiveness of operation, compactness in form and durability.

With the above and other objects in view the invention consists in the novel and useful provision, formation, construction, combination, relative arrangement and interrelation and association of parts, members and features, all as hereinafter described, shown in the drawings and finally pointed out in claims.

A further object of the invention consists in oscillating a moving film in connection with a photographic lens transversely to the line in which the photograph was taken inside of a light excluding housing. My invention also contemplates the method by which a film intermittently moves to make a series of photographs and at the same time the film and the lens are given a slow oscillatory movement transverse to the axial line of light from the objects being photographed and such being done within a light excluding housing.

In the drawings:—

Figure 1 is a side elevation of motion picture apparatus constructed to embody the invention, being an exterior view of the case or box containing the film displaying and motion-producing means and devices utilized further in practicing the invention;

Figure 2 is a fragmentary top plan view of the showing in Figure 1;

Figure 4 is a vertical longitudinal sectional view, taken upon the line $x4$—$x4$, Figures 2 and 3, parts likewise being shown in elevation;

Figure 5 is a detail isometric view of certain film-controlling features shown in Figure 4;

Figure 7 is a detail inner face view of a film gate held against the rear face of the advancing film, and shown in section in Figure 4; and Figure 8 is a further detail vertical sectional view of such film gate, taken upon the line $x8$—$x8$, Figure 7, and looking in the direction of the appended arrows.

Corresponding parts in all the figures are designated by the same reference characters.

Figures 3, 6:
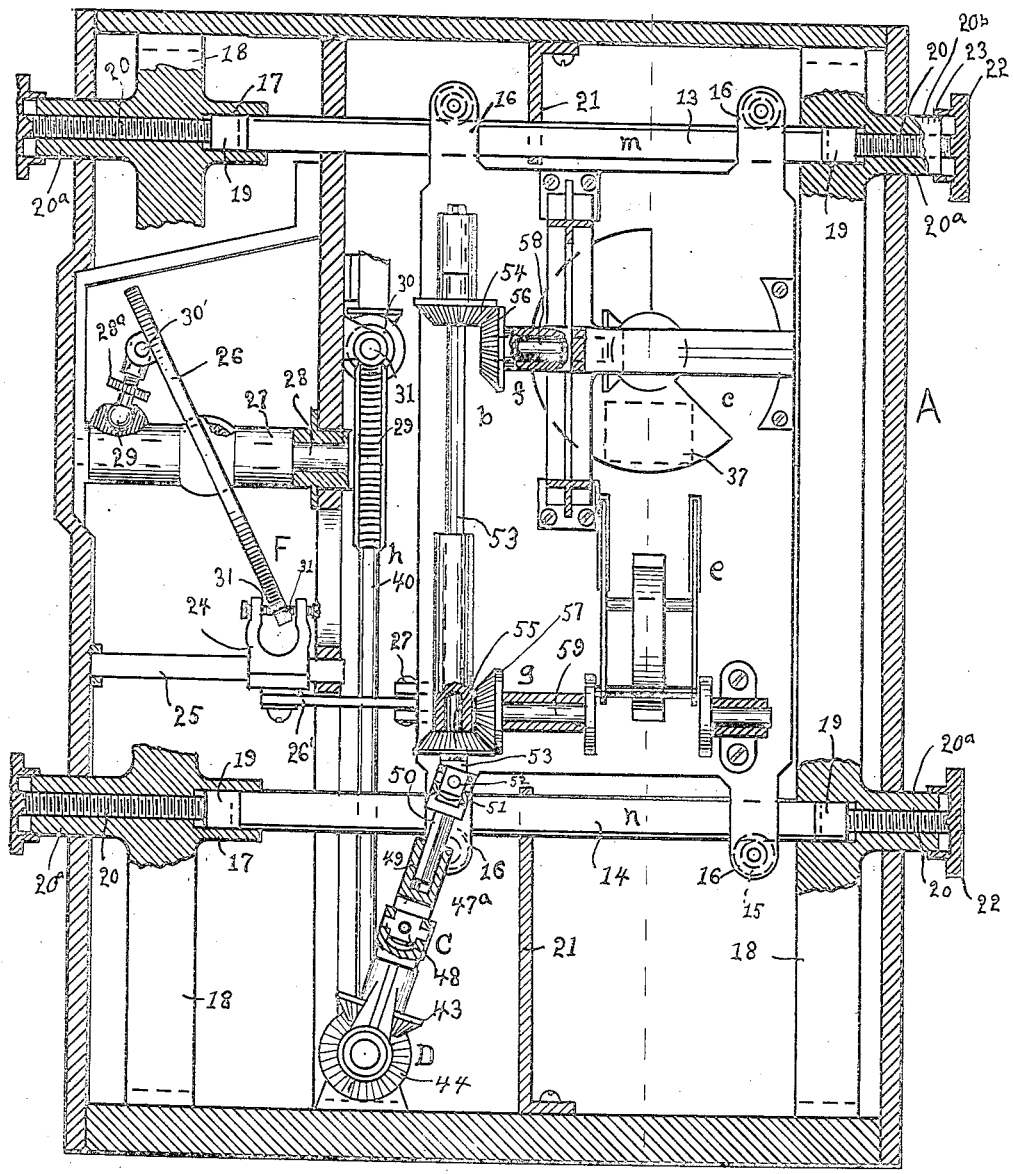
Figure 3 is an enlarged vertical transverse sectional view, taken upon the line $x3$—$x3$, Figure 2, and looking in the direction of the appended arrows, parts being in elevation.
Figure 6 is a detail fragmentary view of a part of a feature of the film-moving mechanism shown in Figure 3.

Referring with particularity to the drawings, the improved motion picture apparatus disclosed therein as embodying the invention comprises a case or box A provided at one side with a hinged or latch-carrying door or closure $a$ by means of which access may be had to the interior of such box or case for inserting and withdrawing films and permitting attention to and adjustment of the contained working features. The front of the box or case A is provided with a transverse elongated opening 10 through which projects the lens holder 11, which in turn is mounted upon a carriage $b$ which supports the shutter $c$, the film gate $d$, and the film advancing means $e$. Likewise upon the carriage $b$ are mounted members $f$ and $g$ and drive means C, which members $f$ and $g$, respectively, actuate the shutter $c$ and the film advancing means $e$. The drive means C transmitting power to such members $f$ and $g$ from a crank shaft D mounted upon the bottom of the box or case A ranging longitudinally thereof, being provided rearwardly of the box or case with a crank 12 whereby the various working features recited may be operated and whereby likewise film feeding means E may be operated through an actuating member $h$, the film being taken off from a feed roller $k$ and, after exposure at the shutter $c$, being wound upon a film reel $l$, such film reel being driven by a member $m$ cooperating with the member $h$ whereby the film feeding means are actuated. The carriage $b$ is adapted to be moved transversely within the case A, in a predetermined path, and in reciprocation, being shown as confined to such predetermined path by tracks or ways $m$ and $n$ ranging transversely of the case and superposed, such tracks or ways preferably consisting of metallic strips 13 and 14, respectively, beveled or edged respectively, at top and bottom to receive wheels or rollers 15 on brackets or hangers 16 at both top and bottom of the carriage.

The ends of the strips 13 and 14 are received in bosses 17 formed upon vertical frame members 18 disposed within the case A adjacent to the sides thereof, the ends of such strips being received by blocks 19 movable within the bosses and borne upon by screw shafts 20 threaded into bosses $20^a$ at the outer sides of said frame members 18, which bosses project outwardly of the case A through suitable openings. The ends of strips 13 and 14 are socketed into blocks 19 so as to prevent axial displacement of the strips, and guides 21 depending from the top of the case and rising from the base of the case, respectively, receive the strips and are horizontally slotted so as to permit the strips to be bowed or laterally displaced, but prevent vertical displacement thereof. Fixed to the outer end of each of the screw shafts 20 is a thumb piece 22 provided with a flange 23 overhanging the respective bosses $20^a$, which latter are calibrated longitudinally as at $20^b$ to be read in connection with the periphery of the respective flange 23, which latter is calibrated circumferentially as at $20^c$ so that fine sub-readings may be made of the calibrations 20 in the definite and delicate adjustment of the screw shafts 20 to vary the longitudinal formation or extensions of the strips 13 and 14, in the predetermined variation of the path to be traversed by the carriage $b$ and the rollers 16 by which the same is guided.

F designates means for causing the reciprocation of the carriage $b$ and the film exposing means mounted thereon, in the operation of such film exposing means. Such means F is disclosed as comprising a traveller 24 mounted upon a transverse way or track 25 supported by frame members within the case, and connected by a link 26' with one edge of the carriage $b$, as at 27; said traveller being reciprocated upon its way by means of a plate cam 26 adjustably mounted upon but rotatively connected with a hub 27 upon a shaft 28 driven by a worm gear 29 meshing with a worm 30 upon a short shaft 31 driven by the member $h$ which operates the film feeding means E. The means of adjustment for this plate cam 26 comprises an adjusting thumb screw $28^a$ having a universal mounting at one end as at 29 upon the hub 27 and pivotally connected at the other end as at 30 with the disk cam 26 at one face thereof, the disk cam adjacent to its periphery being received between adjustable points 31 carried by the traveller 24. As the shaft 28 rotates, in the drive of the film feeding means E, the disk cam 26 executes a movement, due to its oblique disposition, which causes reciprocation of the traveller 24 and resultant reciprocation of the carriage $b$ with the film exposing and advancing means.

The film feeding means E may comprise a toothed double sprocket 32 beneath which the film $p$ is trained and held to the sprocket by a tension roller cage 33. Thence, the film is looped in the customary or any preferred manner, upwardly and passed downwardly rearward of the carriage $b$ and forward of the film gate or pressure gate $d$ carrying rollers 34 which bear directly upon the film through apertures 35 in the pressure gate. The pressure gate $d$ is provided with the usual exposure aperture 36 registering with the shutter aperture 37, and in registration with the lens holder 11 the lens in which is properly disposed for the direction of the light rays to the film advancing over such apertures. The film $p$ after its exposure at the shutter is looped downwardly and thence passed over a toothed double sprocket 38, corresponding to the sprocket 32, and disposed beneath the same, being held thereto by a tension roller cage 33 identical with the roller cage 33 applied to the film at the double sprocket 32. The film is thence lead to the reel $l$ upon which it is wound by the member $m$ which may consist of a belt drive 39 connecting the shaft and the double sprocket 38 upon which such shaft or reel is mounted.

The double sprockets 32 and 38 are provided with suitable journaled shafts $32^a$ and $38^a$ provided with fixed helical gears $32^b$ and $38^b$ which are driven by helical pinions $32^c$ and $38^c$ upon a vertical shaft 40, the member $h$ for driving the film feeding means E being so organized, such shaft 40 being driven by bevel gears 41 from the crank shaft D.

The drive or transmission means C for operating the members $f$ and $g$ upon the carriage $b$ and whereby the shutter $c$ and the film advancing means $e$ are respectively actuated, comprise a short shaft 42 provided at one end with a beveled gear 43 meshing with a similar beveled gear 44 upon the crank shaft D and carrying loosely a bracket 45, between collars 46, which in turn support the shaft 42 over its bevel gear 43 abutting against a collar 47 carrying a pair of upstanding ears $47^a$ between which is pinned a cubical block 48 which in turn carries a telescopic socket 49 for one end of a shaft 50 bifurcated as at 51 to receive a pivoted block 52 to which is pinned the lower bifurcated end of a shaft 53. This shaft is journaled upon the carriage $b$ and carries bevel gears 54 and 55 which respectively mesh with bevel gears 56 and 57 upon short shafts 58 and 59 which respectively drive the shutter $c$ and the film feeding means $e$, which shutter and film feeding means are of the usual standard construction, and serve respectively, to expose successively the image receiving surfaces of the film, and to feed the film in intermittent motion across the shutter aperture 37. In order to seal the opening 10 in the forward wall of the case A against invasion by light except through the lens holder 11 and the lens therein, I provide a bellows apron 60 tacked upon the forward wall of the case and covering such opening 10 surrounding the lens holder 11, and being attached to a collar 61 upon the latter.

The operation, method of use and advantages of the improvements in motion picture apparatus constituting the invention will be readily understood from the foregoing description taken in connection with the accompanying drawings and the following statement:

The film $p$ is withdrawn from the drum or reel $k$ in the rotation of the shaft 40, and is intermittently passed behind the shutter $c$ by the film advancing means $e$, in the customary manner, and is thence taken up and passed to the reel $l$. The looped portions of the film, just before the film is led to the pressure gate $d$ and just after the film leaves the pressure gate, permit the carriage $b$ to be reciprocated, or rather accommodate such reciprocating movement, the film simultaneously being advanced and receiving in sequence the light impressions forming the successive images upon the films. As the carriage $b$ upon which are mounted the film exposing means or features is reciprocated by the means F during the feed of the film by the means E and its advance by the means e past the shutter-controlled aperture, the angularity of the path of vision or of the path of light ray traverse varies transversely, as the sequence of images are produced upon the film, and it therefore results, as initially herein pointed out, that the successive images constituting the recordations of the details of the subject being photographed so as to produce a pictorial result, in the projection of the resultant images expressive of the relations between details of the subject photographed varyingly remote from the picture-taking apparatus, that the resultant picture has the depth which, as above set forth, is a quality of visual observation of a given subject or view. The drive means C, because of the interconnection of the parts thereof, permit actuation of the members $f$ and $g$ for driving the shutter and the film feeding means respectively, during the reciprocation of the carriage $b$.

The path traversed by the carriage $b$ may, as before pointed out, be varied, so that the carriage with the film exposing means may execute a rectilinear movement, or may execute a movement in a path of greater extent than a rectilinear path between two given points. To this end, the strips 13 and 14 constituting the ways $m$ and $n$ for the carriage $b$ may be flexed or bowed out of true straight form, so that such ways may assume varying arcuate forms, predetermining the path which the carriage $b$ must take in its reciprocation through the means F for that purpose. By carefully predetermining the arcuate form of these ways, it is possible to cause the film exposing means to traverse a path which circumscribes the subject being photographed or partially circumscribes the same, such path being positive and predetermined so as to be true in its arcuate form to a radius having its center at the subject being photographed. Thus when the images produced upon the film are projected in displaying the resultant picture the proper depth is given to the picture without the subject thereof being caused to seem to execute a transitory movement. Such transitory movement appears to occur in the resultant picture when the film exposing means are moved in a rectilinear path, to an extent in direct relation to the distance at which the subject being photographed is stationed or positioned from the camera. Therefore, under certain circumstances, the use of such straightaway path for the film exposing means is entirely satisfactory, whereas under other circumstances the curved path is preferable or necessary in order to produce proper photographic effects. It will be understood that within the spirit of the invention the ways $m$ and $n$ may be distorted so as to assume any predetermined lines of extension greater in length than the shortest path between two given points. The arcuate or bowed distortion of the paths is found best to provide for true and satisfactory results under the usual circumstances. It will be understood that the strips 13 and 14 are thus bowed, or if bowed, straightened out or are freed to tend to straighten out, by the turning of the screw shafts 20 through the agency of the thumb pieces 22 subject to determination as to degree by means of the calibrations $20^b$ and $20^c$.

It is manifest that many variations in provision, construction, formation and interrelation of parts, members and features, may be made, in departure from the specific disclosure of the foregoing description and the drawings, without departing from the spirit of the invention or a fair interpretation thereof.

It will be noted that an important feature of my invention is that the camera box used for excluding the light is stationary and that the film and the lens are slowly oscillated, the oscillation being transverse to the axial line of the light used in photographing a scene or objects. Therefore only comparatively light weight devices require to be oscillated and in this slow oscillation the intermittent photography is being carried on in the ordinary manner.

Another feature of my invention is in shifting the film with the lens on arcuate tracks which may be varied to form substantially the arc of a circle, the shorter of which approximates a part of the scene or objects to be photographed and thus this central part always maintains a constant position on the film, whereas the parts of the scene or objects in front and behind of this center point, are shifted relative to this neutral line or point on the film.

My invention further pertains to the method of operation in which a photographic film is moved in one direction and the film together with the lens is given an oscillatory movement at right angles to the motion of the film and transversely to the axial line of the system of lenses. Therefore while the film is being intermittently exposed, it is being gradually shifted in position, first to one side and then to the other side of what may be termed a neutral or center line of the oscillation. This oscillation is so slow relative to the rate at which the intermittent pictures are taken, that even if the film is being moved during the time of an exposure, this does not interfere with the clearness of such individual picture. It will be noted in this case that no attempt is made to synchronize the lateral movement of the film with the shifting movement for making individual exposures.

My method further contemplates moving the film transversely in the arc of a circle, with a certain point of the scene or objects to be photographed forming the center of this arc and at the same time giving film an intermittent movement to form individual pictures or frames on the film. In this action the objects in front and behind the central point are photographed in different positions relative to the objects forming the center point of the oscillation of the film and in this procedure the oscillatory movement is regular and slow compared with the movement of the film in its intermittent motion for the purposes of photography and the exposure by the moving shutter.

I claim:

1. A camera comprising a light-tight stationary case having a transverse elongated lens opening in the front thereof, a carriage, flexible ways inside said case on which said carriage moves, means for causing said ways to assume a circular arc, a lens holder rigidly mounted with relation to said carriage and projecting through said elongated lens opening, a lens system mounted in said lens holder, means for connecting said lens holder in light-tight relation with said case, film moving means for moving and guiding a film vertically across an aperture formed in said carriage in such a position as to expose said film, and means for moving said carriage and lens holder in said case.

2. A camera comprising a light-tight stationary case having a transverse elongated lens opening in the front thereof, a carriage, flexible ways inside said case on which said carriage moves, means for causing said ways to assume a circular arc, a lens holder rigidly mounted with relation to said carriage and projecting through said elongated lens opening, a lens system mounted in said lens holder, means for connecting said lens holder in light-tight relation with said case, film moving means for moving and guiding a film vertically across an aperture formed in said carriage in such a position as to expose said film, an operating shaft turning in fixed bearings in said case, mechanism for connecting said shaft to said film moving means in all positions of said carriage, and means for moving said carriage and lens holder in said case.

3. A camera comprising a light-tight stationary case having a transverse elongated lens opening in the front thereof, a carriage, flexible ways inside said case on which said carriage moves, means for causing said ways to assume a circular arc, a lens holder rigidly mounted with relation to said carriage and projecting through said elongated lens opening, a lens system mounted in said lens holder, means for connecting said lens holder in light-tight relation with said case, film moving means for moving and guiding a film vertically across an aperture formed in said carriage in such a position as to expose said film, an operating shaft turning in fixed bearings in said case, mechanism for connecting said shaft to said film moving means in all positions of said carriage, reciprocating means for reciprocating said carriage and lens holder inside said case, and means by which said operating shaft actuates said reciprocating means.

In testimony whereof I have signed my name to this specification.

WILLIAM F. ALDER.